Patented Apr. 7, 1953

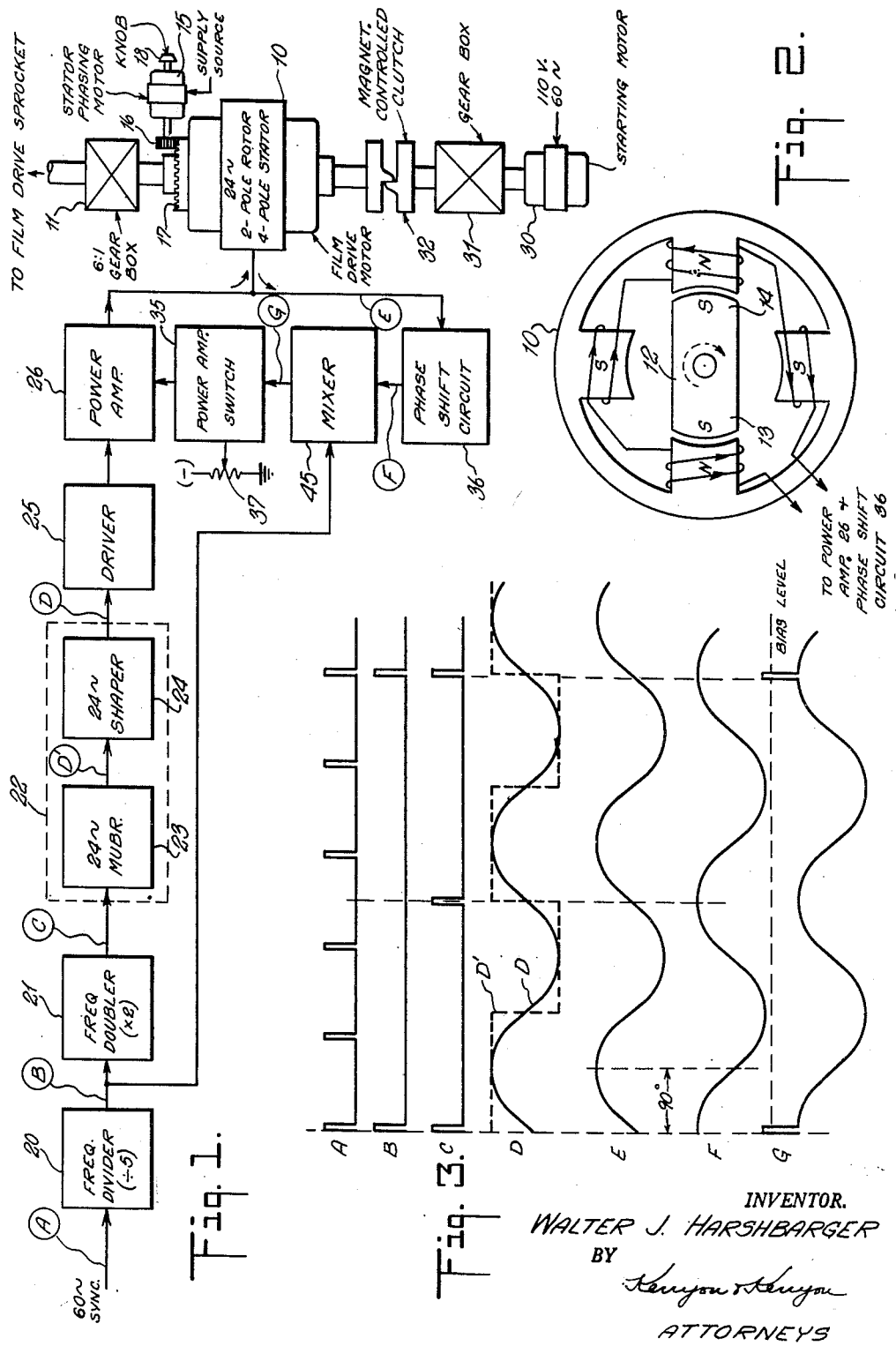

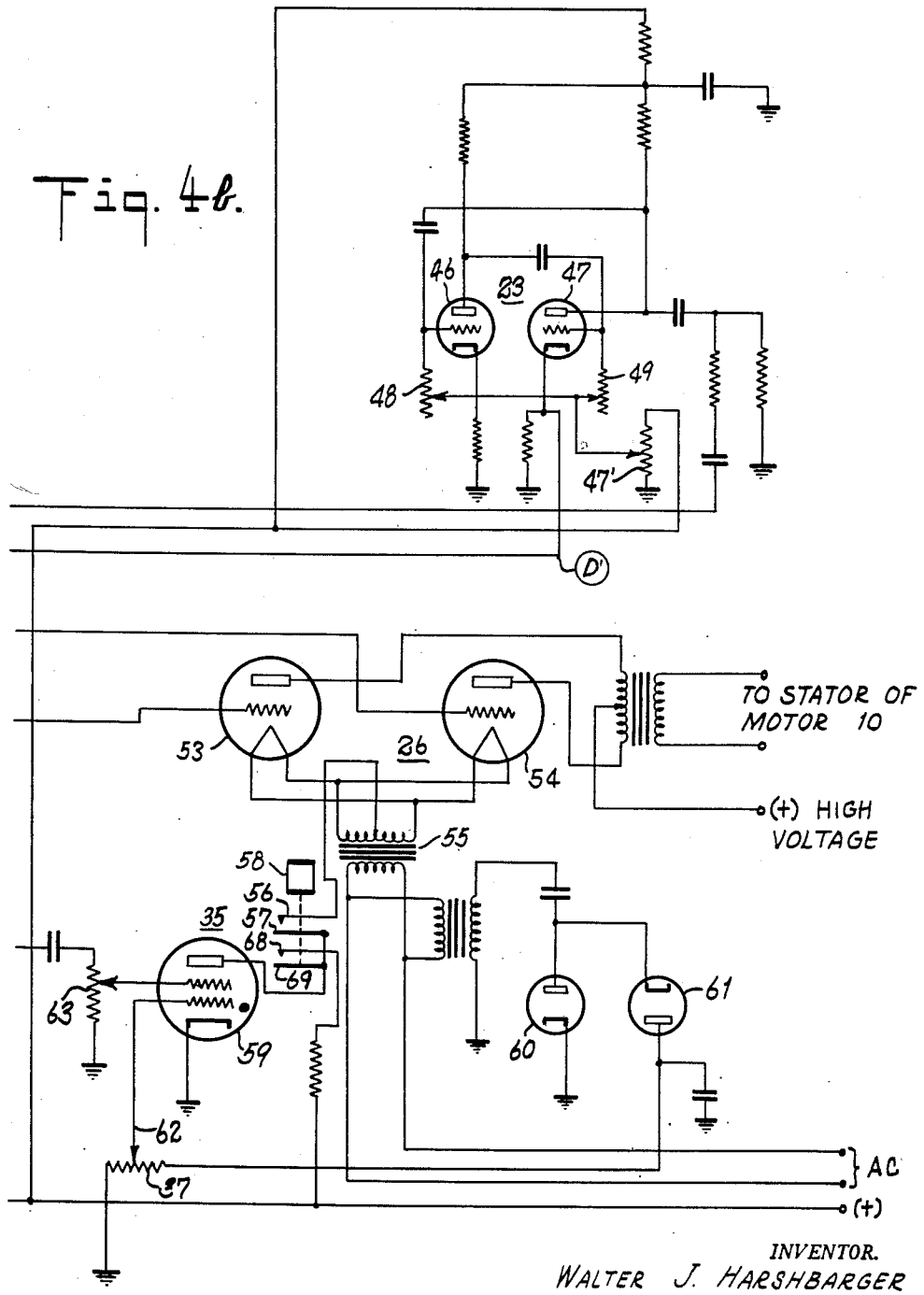

2,634,388

UNITED STATES PATENT OFFICE 2,634,388

STARTING AND ROTOR POSITIONING APPARATUS FOR SYNC PULSE-CONTROLLED SYNCHRONOUS MOTORS

Walter J. Harshbarger, New York, N. Y.

Application February 17, 1950, Serial No. 144,626

8 Claims. (Cl. 318—137)

My invention pertains to apparatus for starting and synchronizing the rotor of a synchronous motor in a predetermined angular position with each occurrence of a series of regularly recurring or sync pulses, and more particularly to apparatus for starting the rotation of and fixing the rotor of the drive motor for motion picture film which is to be televised in a predetermined angular position with the occurrence of a television synchronizing pulse.

In a continuous motion flying spot film scanning apparatus, such as is disclosed in my co-pending application for Method of Televising Motion Picture Film, Serial No. 130,134, filed November 30, 1949, the problem arises of accurately positioning the film frame in correct position in the film gate aperture in order to insure that the first transverse or "horizontal" trace of each light raster upon the face of the flying spot tube will scan the leading edge of the corresponding motion picture film frame. In the absence of some synchronizing means, the scanner will have to be framed each time it is started with a particular reel of film, since there is no physical marking or indication which will show the correct position in which the film must be placed to insure its proper framing. This is unlike a standard motion picture film theatre projector, where the film actually stands still during the projection of each frame and makes its framing procedure relatively simple.

Since each light raster upon the face of the flying spot tube is initiated by means of television vertical synchronizing or sync pulses, some synchronization of the framing to these sync pulses must be made. In the case of standard 16 mm. film there is one sprocket hole for each frame along the length of the film, and if the film is properly printed this sprocket hole coincides with the center line of the space between adjoining frames. In the televising of 16 mm. film the teeth on the driving sprocket may, therefore, be utilized in determining frame location.

In accordance with my invention I synchronize the position of the film driving motor rotor with a vertical sync pulse so that one film sprocket hole arrives at a predetermined position axially of the film path simultaneously with that vertical sync pulse.

My invention will be more apparent from the following description when taken with the accompanying drawings in which:

Fig. 1 is a diagrammatic drawing in block and schematic form illustrating a film drive system in accordance with my invention;

Fig. 2 is a schematic drawing of a four-pole stator two-pole rotor motor as used in the embodiment of Fig. 1;

Fig. 3 shows certain wave forms useful in explaining the embodiment of Fig. 1; and Figs. 4a and 4b are detailed circuit diagrams of the majority of the electronic circuitry of the embodiment of Fig. 1.

Figure 4A:
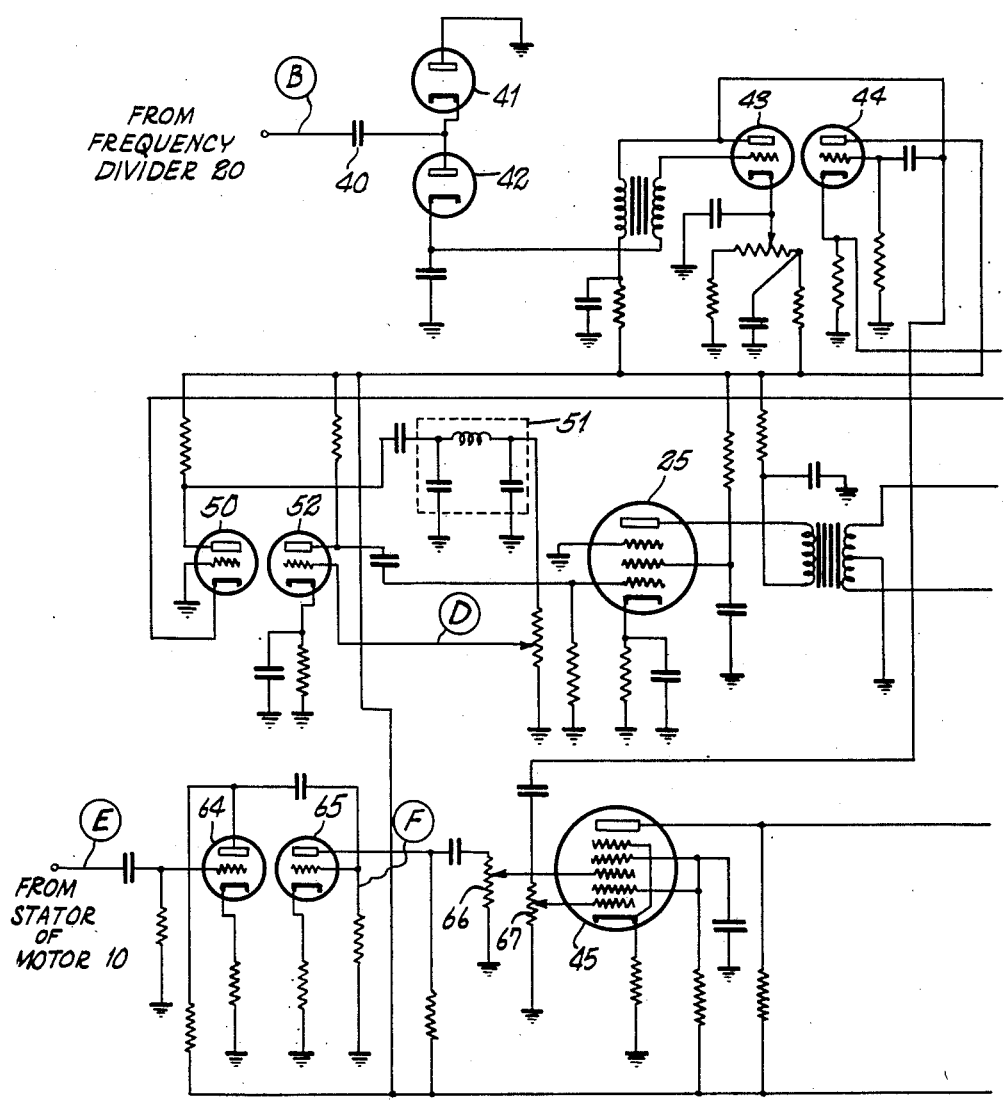

The continuous motion flying spot film scanning apparatus of my above-mentioned application requires that the leading edge of one film frame be positioned at one edge of the film gate aperture when the first light raster on the face of the flying spot tube begins to be scanned or produced. The film, and hence this particular film frame, moves across the film gate aperture from the above-mentioned edge at the rate of 0.120 inch every $\frac{1}{60}$ of a second. During the continuous film movement this particular film frame is scanned three times and the next film frame in sequence along the film is scanned twice. The next film frame is again scanned three times and the ensuing one twice, etc. Thus the teeth of the film driving sprocket must be so disposed angularly that the leading edge of a film frame is positioned at the edge of the film gate aperture where the flying spot of light is to begin its raster cycle simultaneously with the occurrence of the corresponding television vertical sync pulse or impulse which initiates the corresponding first flying spot of light raster upon the face of the flying spot tube. Also, the sprocket teeth must be so disposed angularly for successive sync pulses that the film moves 0.120 inch between pulses, and thus travels 0.6 inch (the space occupied by two film frames) between every six sync pulses.

These conditions may be met by using a twelve-tooth sprocket to drive the film and driving this sprocket at 120 R. P. M. to produce the desired 36 feet per minute movement of the film. The angular displacement of the sprocket teeth is thus 30 degrees and the radius of the sprocket is made such that the circumferential difference between center lines of adjacent teeth is 0.3 inch.

By utilizing a four-pole stator two-pole rotor synchronous motor the angular position of this motor rotor relative to the stator can be fixed and made the same each time a synchronizing impulse occurs. By rotating this rotor at 720 R. P. M. and providing a 6:1 gear reduction between the rotor and the film drive sprocket, one sprocket tooth will occur at a fixed angle relative to its fixed sprocket bearing each time the motor rotor assumes its predetermined angular position relative to its stator. Thus the linear position of the film sprocket holes, and hence the leading edge of each film frame along its path, can be fixed coincident with the synchronizing pulse.

This will be more apparent from an examination of the embodiment of Fig. 1, considering the mechanical portion thereof first. As above described, a synchronous four-pole stator two-pole rotor drive motor 10 is coupled through 6:1 reduction gear 11 to the film drive sprocket (not shown).

This drive motor is shown schematically in Fig. 2 and has its four stator poles wound as shown. Its two rotor poles are similarly poled, e. g., so that both are either north poles or south poles, the latter being illustrated. For driving 16 mm. film I have found that a permanent magnet rotor is satisfactory. If additional torque output from the motor is required, as when driving 35 mm. film, this permanent magnet rotor could be replaced with an electromagnetic rotor having D. C. coils wound thereon and fed through slip rings.

Assuming that the alternating current passing through the stator coils is at the moment at its maximum value, the stator poles would be poled as shown in Fig. 2 and producing substantially their maximum flux. For this condition, rotor 12 must in its rotation assume either the position shown or a position 180 degrees removed therefrom, with the pole 13 at the right of the drawing and the pole 14 at the left. Thus, for this condition, the rotor must assume either one of two positions 180 degrees removed from one another. Due to the 6:1 gear reduction provided by gear box 11 (Fig. 1) a 180-degree movement of rotor 12 of motor 10 provides only a 30-degree movement of the film drive sprocket (not shown). Since the teeth on the film drive sprocket are spaced 30 degrees apart, this insures that no matter which of its two positions rotor 12 assumes, one sprocket tooth of the film drive sprocket will be in a predetermined angular position relative to its fixed bearing as determined by the angular position of rotor 12 shown relative to its stator.

Assuming that rotor 12 of synchronous motor 10 is rotating clockwise, as indicated by the dotted arrow, when the current through the coils of the stator thereafter begins to decrease, the maximum flux of each pole will decrease, the result being a rotating field which pulls the rotor and causes it to revolve clockwise in accordance with conventional motor theory as the current through the stator coils alternates in polarity.

As shown in Fig. 1, a stator phasing motor 15 of a reversible type and controlled from a suitable supply source is provided. A pinion 16 on the shaft of motor 15 engages a cooperating crown gear 17 on the stator of film drive motor 10 which is rotatable relative to its fixed base (not shown). Thus by rotation of the stator of film drive motor 10 the position of its rotor 12, and hence the position of the film drive sprocket teeth and in turn the position of each film frame along the film path, can be adjusted to insure proper framing at the instant with the occurrence of each television vertical sync impulse which initiates the flying spot of light raster cycle. A knob 18 is provided on the other end of the shaft of motor 15 to provide for manual control if desired.

To produce the desired 720 R. P. M. output from motor 10 utilizing a four-pole stator requires a supply frequency of 24 cycles per second, in accordance with the well-known formula:

$$R. P. M. = \frac{120 \times \text{frequency (C. P. S.)}}{\text{No. of stator poles}}$$

This is readily obtainable from the 60-cycle synchronizing or sync pulses by passing them successively through a scale-of-5 counter or frequency divider and a frequency doubler and then utilizing the output of the latter to control a 24-cycle sine wave generator.

Referring now to Fig. 3, in line A thereof there are represented the 60-cycle vertical sync television pulses. Line B shows the result of passing these 60-cycle pulses through a scale-of-5 counter or frequency divider, the result being a pulse coincident with each sixth pulse of line A as shown. Each pulse output or impulse of line B is utilized in the continuous motion flying spot film scanning apparatus of my above-mentioned application to initiate the light raster cycle upon the face of the flying spot tube, each raster cycle consisting of five light rasters in succession, each initiated by a 60-cycle sync pulse of line A and displaced one from the other upon the face of the flying spot tube so as to scan alternate frames of the film thrice and intervening frames twice.

Thus the 12-cycle pulses of line B of Fig. 3, which correspond to every sixth vertical sync pulse of line A, can conveniently be utilized to synchronize the position of the film driving motor rotor so as to fix in turn the position of the film driving sprocket teeth and thus insure that the leading edge of a film frame lies at the proper edge of the film gate aperture at that instant. This can be accomplished in accordance with my invention by synchronizing the 24-cycle power source for film driving motor 10 with the 12-cycle pulse output of line B.

Referring now to both Figs. 1 and 3, the 60-cycle sync pulses of line A (Fig. 3) are fed through frequency divider 20 to produce the 12-cycle pulses of line B (Fig. 3). These 12-cycle pulses are then fed through frequency doubler 21 to produce the 24-cycle pulses of line C (Fig. 3), alternate ones of which occur simultaneously with the 12-cycle pulses of line B and every sixth 60-cycle sync pulse of line A (Fig. 3). These 24-cycle pulses of line C are utilized to produce a 24-cycle synchronized sine wave output from alternating voltage generator 22, which comprises 24-cycle multivibrator 23 and 24-cycle sine wave shaper 24. The 24-cycle square wave output of multivibrator 23 is shown in dotted lines in line D of Fig. 3 and indicated by the reference character D'. The sine wave output, produced by the passage of wave form D' through sine wave shaper 24, is shown in full lines in line D of Fig. 3 and is indicated by the reference character D. This 24-cycle synchronized sine wave output is then amplified by driver 25 before being applied to power amplifier 26, whose output is connected to the stator windings of film drive motor 10.

Since film drive motor 10 is of the synchronous type, it must be brought up to its synchronous speed by external means. Furthermore, the rotor 12 of motor 10 must, in addition to rotating at its synchronous speed of 720 R. P. M., also have its angular position at the instant of application of power to its stator from power amplifier 26 such that the stator and rotor pole relationships are as shown in Fig. 2 or the equivalent thereof. Drive motor 10 is brought up to speed by means of starting motor 30, which is supplied from any 110-volt 60-cycle source. Preferably, starting motor 30 is of the capacitor-start four-pole synchronous type having a synchronous speed of 1800 R. P. M. Motor 30 is connected to the shaft of drive motor 10 through a 5:2 reduction gear box 31 and a magnetically-controlled clutch 32. Clutch 32 preferably has only a single tooth so that after motor 10 has its power applied and before clutch 32 is disengaged and starting motor 30 stopped, the position of its rotor relative to the shaft output of gear box 31 can vary by more than 180 degrees.

The 24-cycle sine wave output of power amplifier 26 can be applied to the stator of motor 10 only when power amplifier switch 35 (Fig. 1) is actuated. The actuation of this switch 35 is controlled by comparing the frequency and phase of the output of motor 10, which operates as a generator during starting when driven by starting motor 30 and thus produces a temporary output alternating current, with the occurrence of the 12-cycle synchronizing pulses from frequency divider 20. The voltage and frequency of the stator output of motor 10 when operated as a generator will, of course, vary from zero to the maximum designed voltage for the stator windings and 24-cycles, respectively, as drive motor 10 comes up to speed. When rotor 12 of drive motor 10 has been brought up to 720 R. P. M. so that the stator winding output of motor 10 occurs at 24 cycles per second and has reached this designed value, at some instant the phase of this voltage output from the startor will be as shown in line E of Fig. 3 or, in other words, in phase with the corresponding 24-cycle output of power amplifier 26 (line D of Fig. 3). This is the instant at which power amplifier switch 35 should be actuated.

This phase correspondence between the wave forms of lines D and E of Fig. 3 is determined as follows. The stator output of motor 10 acting as a generator is passed through a phase-shift circuit 36, which advances the phase of its output 90 degrees relative to that of its input. The output of phase-shift circuit 36 is shown in line F (Fig. 3) and leads that of line E by 90 degrees. This output of circuit 36 is combined with the 12-cycle pulse of line B (Fig. 3) in mixer 45 to produce an output whose wave form is shown in line G of Fig. 3. This combined output is fed to power amplifier switch 35, which is suitably biased as by means of potentiometer 37 so that it will be actuated only when the phase of the output of phase-shift circuit 36 is such that the maximum or peak of its sine wave output occurs substantially simultaneously and is in synchronism with a 12-cycle pulse of line B (Fig. 3) from frequency divider 20. When this coincidence occurs, power amplifier switch 35 is actuated and allows power amplifier 26 to deliver its 24-cycle output, shown in full lines in line D of Fig. 3, to the stator of drive motor 10.

In Figs. 4a and 4b are shown in detail the circuitry of the electronic portions of Fig. 1 with the exception of frequency divider 20 and frequency doubler 21. Frequency doubler 21 has been omitted in the particular circuitry shown in Figs. 4a and 4b for reasons which will be pointed out hereinafter. Frequency divider 20 may be of any suitable conventional design, such as a scale-of-5 "ring" counter so as to pass every sixth 60-cycle vertical sync television pulse. The output of frequency divider 20 is connected through coupling condenser 40 to the cathode of clamper 41 and the plate of isolating diode 42. Clamper tube 41 has its plate connected to ground and is included to insure that only positive synchronizing pulses from frequency divider 20 are passed through isolating diode 42. The output of isolating diode 42, taken from its cathode, is then passed through blocking oscillator 43 to sharpen the 12-cycle pulses. These sharpened 12-cycle pulses, taken from the plate of blocking oscillator 43, are coupled to the grid of cathode follower 44 and one grid of mixer 45. The output of cathode follower 44 is connected to the grid of tube 46 of 24-cycle free-running multivibrator 23. This multivibrator comprises two tubes 46 and 47. Potentiometer 47' is common to the grid circuits of both tubes 46 and 47 and controls the frequency of the multivibrator output. Resistor 48 in the grid circuit of tube 46 and resistor 49 in the grid circuit of tube 47 control the duration of the outputs of the two tubes relative to one another and are utilized to equalize the respective halves of the 24-cycle square wave output of multivibrator 23.

It will be noted that the frequency doubler 21 of Fig. 1 has been omitted from the circuitry of Figs. 4a and 4b. This is because I have found in this particular circuit that it is necessary only to synchronize every other cycle of the 24-cycle multivibrator with a 12-cycle pulse of line B (Fig. 3) corresponding to one of the 60-cycle sync pulses of line A (Fig. 3).

This 24-cycle square wave output of multivibrator 23, taken from the cathode of tube 47, is directly connected to the cathode of tube 50. Tube 50 and network 51 in the output circuit thereof constitute the 24-cycle sine wave shaping circuit 24. The resultant 24-cycle sine wave output is amplified and inverted in tube 52 before application to driver 25. The output of driver 25 is transformer-coupled to the grids of push-pull tubes 53 and 54 of power amplifier 26. The output of push-pull tubes 53 and 54 is then transformer-coupled to the stator windings of film drive motor 10.

The center tap of the secondary winding of filament transformer 55 feeding the filaments of power amplifier tubes 53 and 54 is returned to ground through contact 56 and armature 57 of relay 58 and switch tube 59 all in series, these elements constituting power amplifier switch 35 of Fig. 1. Thus power amplifier tubes 53 and 54 can pass current only when relay 58 is actuated and switch tube 59, which is of the gas type as shown, is conducting.

The bias upon the control grid of switch tube 59 is derived from a D. C. bias rectifier comprising two diodes 60 and 61 connected as shown. This bias is adjustable by means of slider 62 of potentiometer 37. The input to switch tube 59, applied to its screen grid, is also adjustable as shown by means of potentiometer 63 and is derived from the plate of mixer tube 45. One input of mixer tube 45 is derived from blocking oscillator 43 as above described. The other input of mixer 45 consists of the stator voltage output of driving motor 10, operating as a generator, phase-shifted by 90 degrees and amplified. This phase shift is obtained by passing the stator voltage output of motor 10 through integrator 64, since integration of a sine wave results in a minus co-sine wave. The output of integrator 64, which corresponds to phase shift circuit 36 of Fig. 1, leads its input by 90 degrees, as shown in lines E and F of Fig. 3. This phase-shifted voltage is then amplified and inverted in tube 65 before being applied to mixer 45. As shown, the relative magnitudes of the two inputs to mixer 45 are adjustable by means of potentiometers 66 and 67, respectively.

The operation of the circuit of Figs. 4a and 4b, with the exception of the operation of relay 58, will not be repeated here since it has been described above in connection with Figs. 1, 2, and 3. Relay 58, in addition to contact 56 and armature 57, also includes contact 68 and armature 69 connected to apply plate voltage to switch tube 59 at the same time that its plate is connected to the center tap of filament transformer 55. In the operation of the embodiment of Fig. 1, relay 58 is actuated simultaneously with the application of power to starting motor 30 and magnetically-controlled clutch 32 as by means of a push-button switch (not shown). So long as this push-button switch is maintained closed, starting motor 30 drives motor 10 through magnetically-controlled clutch 32. When the output of drive motor 10, thus operating as a generator, reaches its proper frequency voltage and phase, as shown in line E of Fig. 3, switch tube 59 will fire as described. This closes the ground return circuit of the center tap of filament transformer 55 and allows power amplifier tubes 53 and 54 to pass current to supply their 24-cycle sine wave output to the stator windings of film drive motor 10. As soon as the operator sees, from a suitable monitor not shown, that the film is being properly scanned and thus is properly framed, removal of his finger from the push-button switch will cause magnetically-controlled clutch 32 to open and starting motor 30 to stop. However, a hold circuit (not shown) for relay 58 is provided to maintain relay 58 energized so that film drive motor 10 continues its rotation. A suitable stop switch is, of course, provided in this hold circuit so that the motion of the film and the rotation of film drive motor 10 can be terminated when desired, as at the end of a desired film sequence or reel.

While the wave forms of lines A, B, and C of Fig. 3 have all been shown as positive, and the wave forms of lines D, E, F, and G have been shown as positive during their first half-cycle, it will be apparent to those skilled in the art that these wave forms as utilized at various points in the circuitry of Figs. 1, 4a, and 4b may be inverted as necessary, while still maintaining their shown phase relationship.

Numerous additional applications of the above-disclosed principles will occur to those skilled in the art and no attempt has here been made to exhaust such possibilities. For example, 24-cycle sine wave generator 22 may comprise an alternating voltage generator which directly develops a sine wave output rather than comprising the 24-cycle multivibrator 23 whose output is shaped into sine-wave form by 24-cycle sine-wave shaper 24 as shown. Also, a four-pole rotor may be utilized in four-pole stator film drive motor 10 providing the diametrically-disposed poles are similarly poled. Thus in Fig. 2 rotor 12 would be modified to include a first north pole extending upward toward the upper south stator field pole and a second north pole extending downward toward the lower south stator field pole.

The scope of my invention is defined in the following claims, wherein by "magnetically-poled" rotor is meant a rotor having magnetic poles produced either by permanent magnetism or by the electrical energization of suitable rotor or armature coils.

I claim:

1. Starting and rotor positioning apparatus for a sync pulse-controlled synchronous motor comprising a sine wave generator adapted to be triggered by the input sync pulses and to produce alternating current of magnitude and frequency suited to drive said motor in synchronism with the pulses, a starting motor adapted to drive the rotor of the synchronous motor at the approximate desired speed and thereby to cause said synchronous motor while under control of the starting motor to generate a temporary output alternating current, a phase-shifting circuit arranged to shift the phase of said temporary output current so that some at least of the peaks of said current are in synchronism with said input sync pulses, a mixer for said phase-shifted current and said pulses, and a switch tube receiving the mixer output and biased to produce, in response to the coincidence of a pulse and a peak in the mixer, a connection between the output of said sine wave generator and the synchronous motor.

2. Starting and rotor positioning apparatus for a sync pulse-controlled synchronous motor comprising a synchronous motor including a four-pole stator, windings therefor, and a magnetically-poled rotor having two similarly-poled diametrically-disposed poles, a starting motor connected to said rotor for driving said synchronous motor at substantially its synchronous speed, an alternating voltage generator under control of the sync pulses for generating an alternating voltage in synchronism with said pulses at a frequency in cycles per second equal to one-thirtieth said synchronous speed in revolutions per minute, a phase-shift circuit connected to said stator windings, a switch tube connected to said phase-shift circuit and the source of said pulses and biased to operate in response to an input produced by substantial coincidence of one of said pulses and the maximum amplitude output of said phase-shift circuit, and a connection between said stator windings and the output of said generator under control of said switch tube.

3. Starting and rotor positioning apparatus for a sync pulse-controlled synchronous motor comprising a synchronous motor including a four-pole stator, windings therefor, and a magnetically-poled rotor having two similarly-poled diametrically-disposed poles, a starting motor connected to said rotor for driving said synchronous motor at substantially its synchronous speed, an alternating voltage generator under control of the sync pulses for generating an alternating voltage in synchronism with said pulses at a frequency in cycles per second equal to one-thirtieth said synchronous speed in revolutions per minute, a phase-shift circuit connected to said stator windings, a mixture connected to said phase-shift circuit and a source of said pulses, a switch tube connected to said mixer and biased to operate in response to an input produced by substantial coincidence of one of said pulses and the maximum amplitude output of said phase-shift circuit, and a connection between said stator windings and the output of said generator under control of said switch tube.

4. Starting and rotor positioning apparatus for a synchronous motor controlled from 60-cycle per second sync pulses comprising a synchronous motor including a four-pole stator, windings therefor, and a magnetically-poled rotor having two similarly-poled diametrically-disposed poles, a starting motor connected to said rotor for driving said synchronous motor at substantially its synchronous speed, a scale-of-5 frequency divider connected to the source of the 60-cycle sync pulses, a frequency doubler connected to said frequency divider, a 24-cycle per second sine wave generator connected to said frequency doubler to produce a sine wave output, each of whose cycles is initiated substantially simultaneously with a 24-cycle pulse from said frequency doubler, a phase-shift circuit for producing a 90° leading phase shift connected to said stator windings, a mixer connected to said phase-shift circuit and said frequency divider, a switch tube connected to said mixer and biased to operate in response to an input produced by substantial coincidence of one of the 12-cycle output pulses of said frequency divider and the maximum aplitude output of said phase-shift circuit, and a connection between said stator windings and the output of said generator under control of said switch tube.

5. Starting and rotor positioning apparatus for a synchronous motor controlled from 60-cycle per second sync pulses comprising a synchronous motor including a four-pole stator, windings therefor, and a magnetically-poled rotor having two similarly-poled diametrically-disposed poles, a starting motor connected to said rotor for driving said synchronous motor at substantially its synchronous speed, a scale-of-5 frequency divider connected to the source of the 60-cycle sync pulses, a 24-cycle per second sine wave generator connected to said frequency divider to produce a sine wave output, every other cycle of whch is initiated substantially simultaneously with a 12-cycle pulse from said frequency divider, a phase-shift circuit for producing a 90° leading phase shift connected to said stator windings, a mixer connected to said phase-shift circuit and said frequency divider, a switch tube connected to said mixer and biased to operate in response to an input produced by substantial coincidence of one of the 12-cycle output pulses of said frequency divider and the maximum amplitude output of said phase-shift circuit, and a connection between said stator windings and the output of said generator under control of said switch tube.

6. Starting and rotor positioning apparatus for a synchronous motor controlled from 60-cycle per second sync pulses comprising a synchronous motor including a four-pole station, windings therefor, and a magnetically-poled rotor having two similarly-poled diametrically-disposed poles, a starting motor connected to said rotor for driving said synchronous motor at substantially its synchronous speed, a scale-of-5 frequency divider connected to the source of the 60-cycle syn pulses, a frequency doubler connected to said frequency divider, a 24-cycle per second multivibrator connected to said frequency doubler to produce a square-wave output, each of whose cycles is initiated substantially simultaneously with a 24-cycle pulse from said frequency doubler, a 24-cycle sine wave shaper connected to said multivibrator to produce a 24-cycle sine wave output in synchronism with said square-wave output of said multivibrator, a phase-shift circuit for producing a 90° leading phase shift connected to said stator windings, a mixer connected to said phase-shift circuit and the output of said frequency divider, a switch tube connected to said mixer and biased to operate in response to an input produced by substantial coincidence of one of the 12-cycle output pulses of said frequency divider and the maximum amplitude output of said phase-shift circuit, and a connection between said stator windings and the output of said sine wave shaper under control of said switch tube.

7. Starting and rotor positioning apparatus for a synchronous motor controlled from 60-cycle per second sync pulses comprising a synchronous motor including a four-pole stator, windings therefor, and a magnetically-poled rotor having two similarly-poled diametrically-disposed poles, a starting motor connected to said rotor for driving said synchronous motor at substantially its synchronous speed, a scale-of-5 frequency divider connected to the source of the 60-cycle sync pulses, a 24-cycle per second multivibrator connected to said frequency divider to produce a square-wave output, every other cycle of which is initiated substantially simultaneously with a 12-cycle pulse from said frequency divider, a 24-cycle sine wave shaper connected to said multivibrator to produce a 24-cycle sine wave output in synchronism with said square-wave output of said multivibrator, a phase-shift circuit for producing a 90° leading phase shift connected to said stator windings, a mixer connected to said phase-shift circuit and the output of said frequency divider, a switch tube connected to said mixer and biased to operate in response to an input produced by substantial coincidence of one of the 12-cycle output pulses of said frequency divider and the maximum amplitude output of said phase-shift circuit, and a connection between said stator windings and the output of said sine wave shaper under control of said switch tube.

8. Starting and rotor positioning apparatus for a synchronous motor controlled from 60-cycle per second sync pulses comprising a synchronous motor including a four-pole stator, windings therefor, and a magnetically-poled rotor having two similarly-poled diametrically-disposed poles, a starting motor connected to said rotor for driving said synchronous motor at substantially its synchronous speed, a scale-of-5 frequency divider connected to the source of the 60-cycle sync pulses, a 24-cycle per second multivibrator connected to said frequency divider to produce a square-wave output, every other cycle of which is initiated substantially simultaneously with a 12-cycle pulse from said frequency divider, a 24-cycle sine wave shaper connected to said multivibrator to produce a 24-cycle sine wave output in synchronism with said square-wave output of said multivibrator, a phase-shift circuit for producing a 90° leading phase shift connected to said stator windings, a mixer connected to said phase-shift circuit and the output of said frequency divider, a switch tube connected to said mixer and biased to operate in response to an input produced by substantial coincidence of one of the 12-cycle output pulses of said frequency divider and the maximum amplitude output of said phase-shift circuit, a connection between said stator windings and the output of said sine wave shaper under control of said switch tube, and means for rotatably securing said stator in a fixed based including means for rotating said stator in said securing means.

WALTER J. HARSHBARGER.

REFERENCES CITED

The following references are of record in the file of this patent:

UNITED STATES PATENTS

| Number | Name | Date |
| --- | --- | --- |
| 1,732,734 | Thomas | Oct. 22, 1929 |
| 1,796,210 | McCrea | Mar. 10, 1931 |
| 1,796,220 | Seely | Mar. 10, 1931 |
| 2,442,123 | Espley et al. | May 25, 1948 |